United States Patent
Crain et al.

(10) Patent No.: US 11,575,220 B1
(45) Date of Patent: Feb. 7, 2023

(54) PROCESS FOR CONSTRUCTING LIGHTNING STRIKE PROTECTION FOR ADHESIVELY BONDED GRAPHITE COMPOSITE JOINTS

(71) Applicants: Bruce R. Crain, Melbourne, FL (US); Eric S. Cramer, Melbourne, FL (US); Michael C. Hofmeister, Redondo Beach, CA (US); Kevin M. Gallenstein, El Segundo, CA (US); Jessica N. Pearce, El Segundo, CA (US); Sandra J. Stash, Redondo Beach, CA (US); Daniel E. Suh, Melbourne, FL (US)

(72) Inventors: Bruce R. Crain, Melbourne, FL (US); Eric S. Cramer, Melbourne, FL (US); Michael C. Hofmeister, Redondo Beach, CA (US); Kevin M. Gallenstein, El Segundo, CA (US); Jessica N. Pearce, El Segundo, CA (US); Sandra J. Stash, Redondo Beach, CA (US); Daniel E. Suh, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 409 days.

(21) Appl. No.: 16/522,832

(22) Filed: Jul. 26, 2019

(51) Int. Cl.
*F16B 11/00* (2006.01)
*H01R 4/64* (2006.01)
*B29C 65/00* (2006.01)
*B29C 65/48* (2006.01)
*H01R 4/04* (2006.01)
(Continued)

(52) U.S. Cl.
CPC ........... *H01R 4/64* (2013.01); *B29C 65/4835* (2013.01); *B29C 66/81455* (2013.01); *B64D 45/02* (2013.01); *F16B 11/006* (2013.01); *H01R 4/04* (2013.01); *H01R 43/00* (2013.01);
(Continued)

(58) Field of Classification Search
CPC ... Y10T 403/47; Y10T 403/473; B64C 3/187; F16B 11/006; B29C 66/1122; B29C 66/43441; B29C 70/00; B32B 2605/18; B64F 5/00; B64D 45/02
See application file for complete search history.

(56) References Cited

U.S. PATENT DOCUMENTS

| 6,589,472 B1* | 7/2003 | Benson ................. B29C 70/544 264/510 |
| 6,849,150 B1* | 2/2005 | Schmidt .................... B64C 1/06 156/285 |

(Continued)

*Primary Examiner* — Amber R Anderson
*Assistant Examiner* — David M Griffin
(74) *Attorney, Agent, or Firm* — Tarolli, Sundheim, Covell & Tummino LLP

(57) ABSTRACT

A bonded joint for use in bonding composite materials is provided and includes a composite rib having electrically conductive properties and a composite structure having electrically conductive properties. An electrically conductive preform is provided that facilitates a bond between the composite rib and the composite structure. A mesh composition that bonds the composite rib to the preform and that bonds the preform to the composite structure is provided and is electrically conductive to conduct current between the composite rib and the composite structure.

16 Claims, 14 Drawing Sheets

(51) Int. Cl.
*H01R 43/00* (2006.01)
*B64D 45/02* (2006.01)
*B29L 31/30* (2006.01)

(52) U.S. Cl.
CPC ...... *B29L 2031/3076* (2013.01); *Y10T 403/35* (2015.01); *Y10T 403/477* (2015.01)

(56) References Cited

U.S. PATENT DOCUMENTS

| | | | |
|---|---|---|---|
| 7,625,510 B2 * | 12/2009 | Ashton | B29C 33/3842 |
| | | | 264/258 |
| 7,625,623 B2 * | 12/2009 | Grose | B29C 65/527 |
| | | | 244/131 |
| 8,228,248 B1 * | 7/2012 | Kahle | H01Q 1/28 |
| | | | 343/705 |
| 9,352,822 B2 * | 5/2016 | Nordman | B29C 66/524 |
| 9,567,104 B2 * | 2/2017 | Sweers | G01N 27/025 |
| 10,005,267 B1 * | 6/2018 | Boone | B29D 24/00 |
| 10,099,458 B2 * | 10/2018 | Haq | B29C 65/4855 |
| 10,265,936 B2 * | 4/2019 | Nielsen | B29C 65/52 |
| 2003/0037867 A1 * | 2/2003 | Bersuch | B29C 65/4835 |
| | | | 156/303.1 |
| 2014/0117022 A1 * | 5/2014 | Ackerman | B29C 66/43 |
| | | | 156/60 |
| 2014/0166191 A1 * | 6/2014 | Cottrell | B32B 37/24 |
| | | | 156/182 |

\* cited by examiner

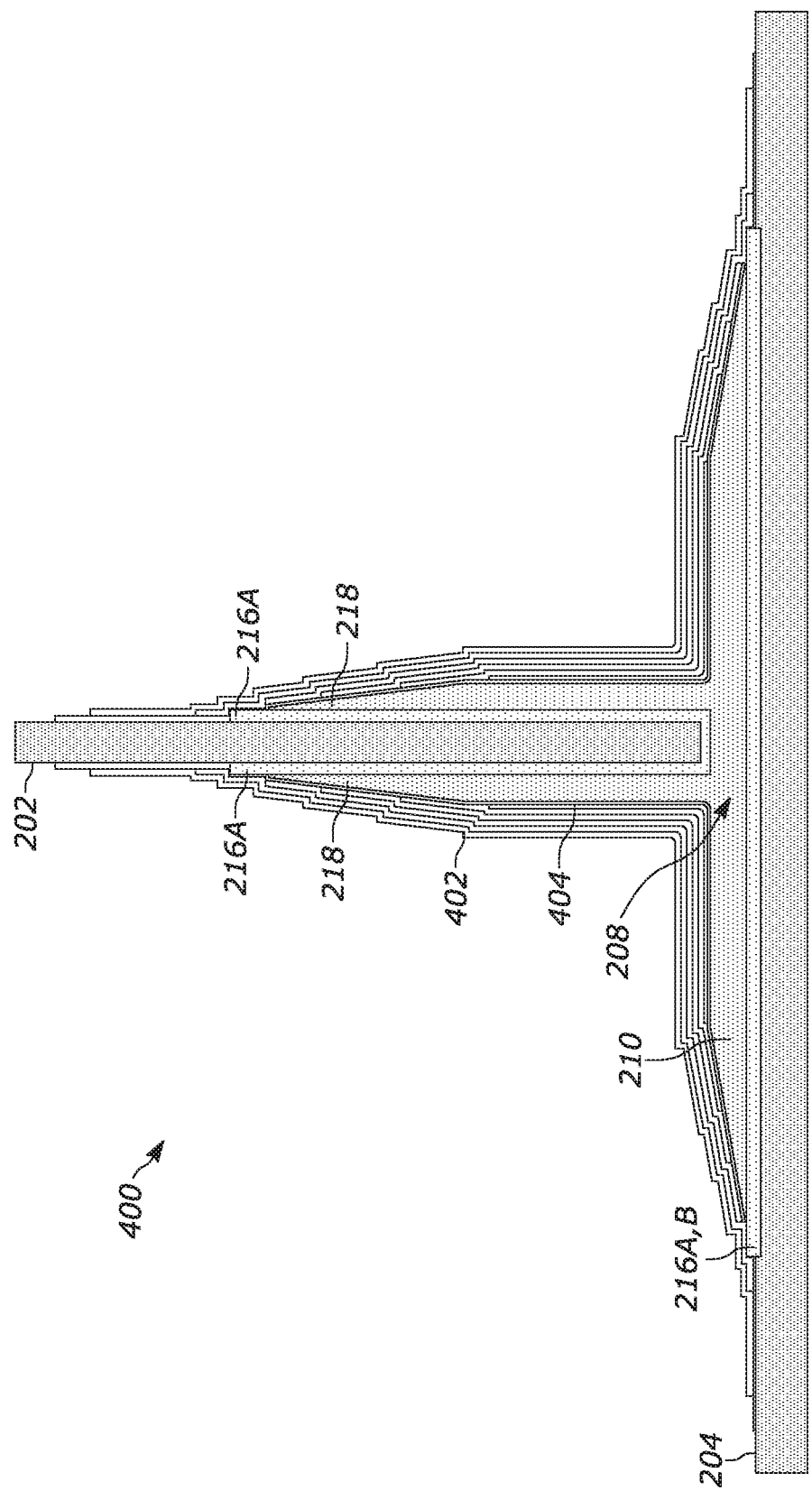

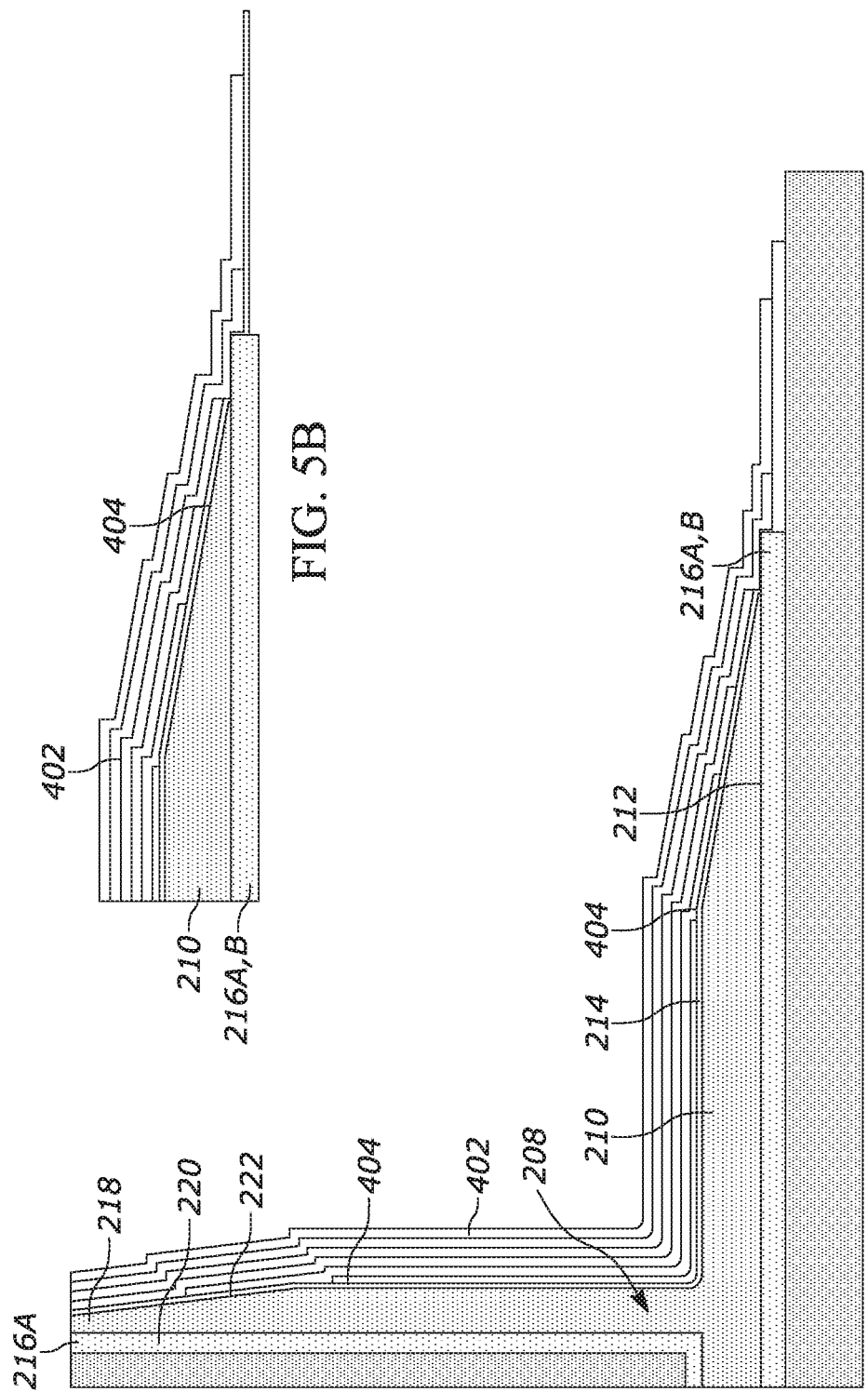

US 11,575,220 B1

PROCESS FOR CONSTRUCTING LIGHTNING STRIKE PROTECTION FOR ADHESIVELY BONDED GRAPHITE COMPOSITE JOINTS

GOVERNMENT INTEREST

The invention was made under Government Contract Number 16-C-0102. Therefore, the US Government has rights to the invention as specified in that contract.

TECHNICAL FIELD

This disclosure relates generally to adhesively bonded joints and more particularly, to lightning strike protection for adhesively bonded composite joints.

BACKGROUND

In aircraft, mechanical fasteners are used to join structural components together, such as in an integrated fuel tank where a joint is formed between a spar or a rib and a skin of the aircraft. The mechanical fasteners provide a path for lightning strike currents to flow through the joint. As the industry gravitates towards newer technology that uses film adhesive with a non-conductive carrier (as an alternative to mechanical fasteners), this presents a technical gap with respect to electrical continuity of the bonded structure for lightning protection. The problem with the film adhesive process is that it electrically isolates the bond joints resulting in possible structural damage and arcing between the structural components in the event of a lightning strike. This is especially a concern with respect to integral fuel tanks.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure includes a bonded joint for use in bonding composite materials that includes a composite rib and skin having electrically conductive properties. An electrically conductive preform is provided that facilitates a bond between the composite rib and the composite structure. A mesh composition that bonds the composite rib to the preform and that bonds the preform to the composite structure is provided and is electrically conductive.

Another example of the subject disclosure includes a method of preparing a composite bonded joint for assembly that includes sanding a surface of a composite rib and a surface of a composite structure to remove non-conductive surface layers and to expose electrically conductive fibers and wiping the surfaces of the composite rib and the composite structure with a clean, dry wiper. A decision is made to determine if a color of the dust removed with the clean, dry wiper is black. If yes, then the remaining dust is removed with the clean, dry wiper. First and second probes are pressed against the sanded surfaces, where the first probe is adjacent to an edge of the composite bonded joint and the second probe is in close proximity of the first probe. A resistance of the sanded surface of the composite rib or the composite structure is measured and the composite rib and the composite structure are deemed to be electrically activated if the measured resistance is below a threshold.

Still another example of the subject disclosure includes a method of assembling a composite bonded joint that includes applying at least one layer of an adhesive onto mounting surfaces of a pair of supports of a preform and applying the at least one layer of the adhesive onto a surface of a composite structure or to a mounting surface of a base of a preform. At least one layer of a conductive scrim that includes a bonding adhesive intertwined with a conductive mesh material is applied onto the mounting surfaces of the pair of supports and on the surface of the composite structure or the mounting surface of the base. A composite rib is inserted into a space defined by the pair of supports of the preform such that the mounting surfaces contact surfaces of the composite rib. The base of the preform is attached to the composite structure and the composite bonded joint is cured.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

FIGS. 4-5C illustrates another example of a composite bonded joint.

DETAILED DESCRIPTION

Figure 1:
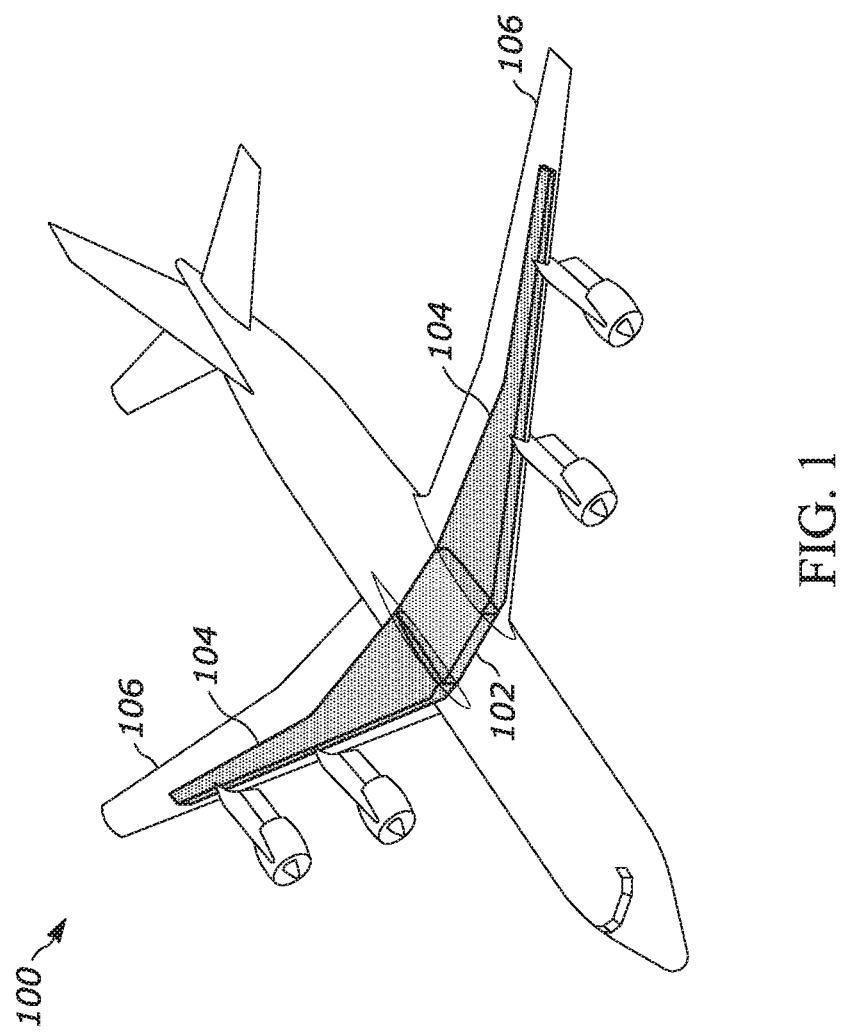
FIG. 1 is a perspective view of an aircraft that may employ a composite bonded joint.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

Disclosed herein is an adhesively composite bonded joint and method to make the same that does not use mechanical fasteners, but that provides the same or better lightning strike protection on aviation vehicles provided by a fastened structure. As the aviation industry moves away from the use of mechanical fasteners and their inherent benefit with respect to carrying the currents from a lightning strike, the innovation provides a two-part process to ensure an equivalent or better method of the ability to safely conduct currents due to a lightning strike. The first part is the process of the removal of non-conductive surface material from the bonding surfaces of the composite material to expose electrically conductive base material. The second part uses a conductive mesh comprised of a conductive material in combination with a film adhesive either inside the bonded joint, or as an overlay to carry current over the adhesively bonded joints. The process has been demonstrated to prevent fuel vapor ignition inside of adhesively bonded composite fuel tanks and maintain structural integrity when subject to severe (Zone 1A) lightning strikes. The process has applicability beyond aerospace to include any systems with composite structures that use adhesively bonded joints and are sensitive to lightning strikes.

FIG. 1 is a perspective view of an aircraft 100 illustrating the location of a center fuel tank 102 and side fuel tanks 104. The side fuel tanks 104 are integrated into each wing 106 of the aircraft 100. In some aircraft the fuel tanks are separate entities and are built into the wing. These types of wings are known as dry wings. In other aircraft, the fuel tank is integrated into the wing. In other words, the structure of the wing serves as the fuel tank. These type of wings are known as wet wings. In either case, ribs and spars of the wing are bonded to the skin of the wing to form bonded joints to stabilize the wing and/or the fuel tank. As mentioned above, the process disclosed herein prevents fuel vapor ignition inside of an adhesively bonded composite fuel tank and maintains structural integrity when subject to severe (Zone 1A) lightning strikes. It is to be understood however, that the innovative bonded joint can be applied to any composite joint application that requires lightning strike protection to allow lightning strike currents to flow through the bonded joint.

Figure 2A:
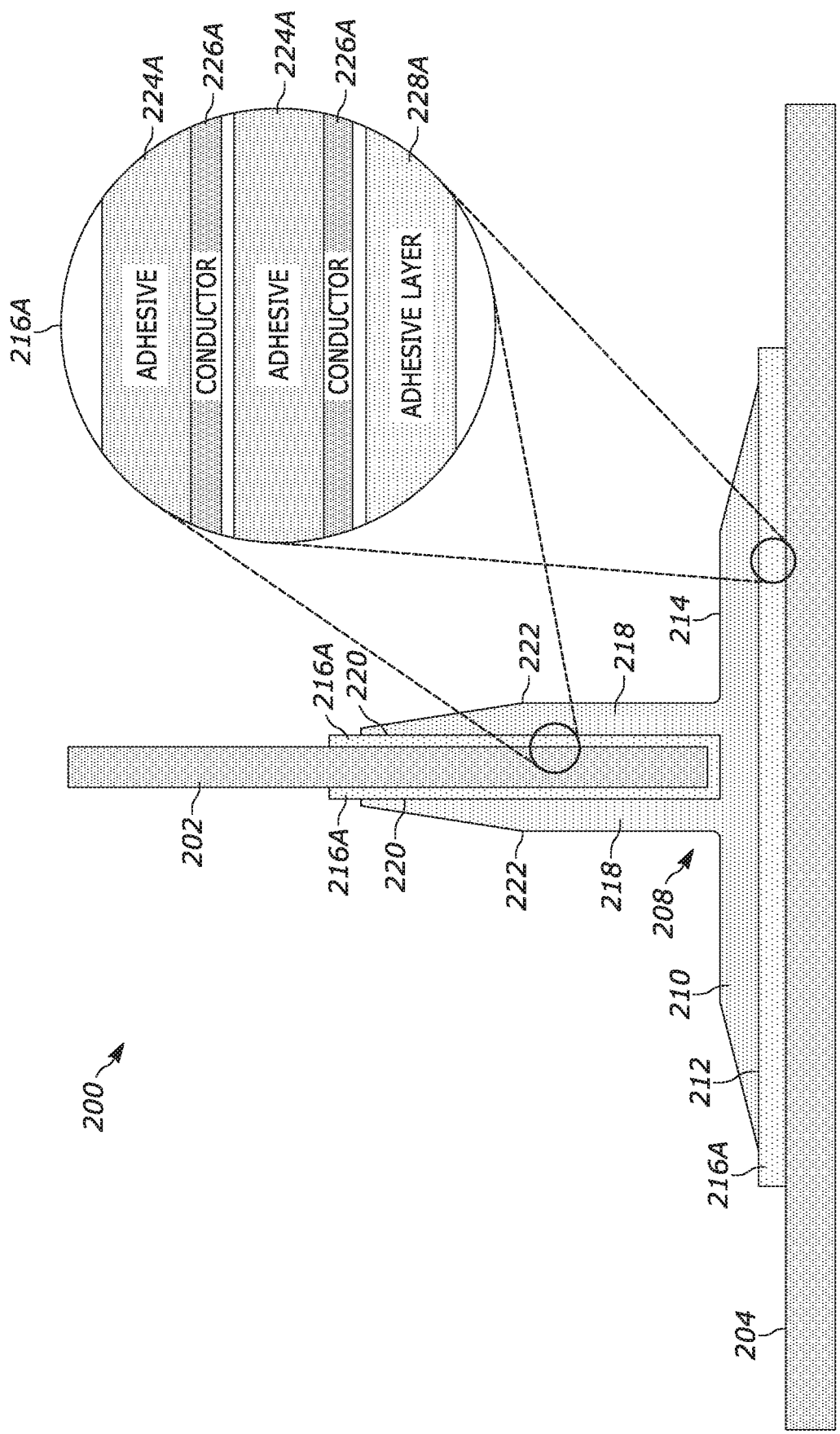
FIGS. 2A and 2B are examples of a composite bonded joint that bonds a composite rib/spar to a composite structure, such as a skin of the wing of the aircraft.

FIG. 2A is an example composite bonded joint 200 that bonds a composite rib/spar ("rib") 202 to a composite structure 204, such as a skin of the wing of the aircraft. Both the rib 202 and the composite structure 204 are made from composite materials that have an electrically conductive base material. Thus as will be explained in detail further below, the rib 202 and the composite structure 204 require prep work to remove non-conductive surface materials and expose the electrically conductive base material.

The composite bonded joint 200 further includes an electrically conductive preform 208 made from a reinforced epoxy material (e.g., carbon/epoxy woven preform). The preform 208 includes a base 210 having a bonding surface 212 and an attachment (first attachment) surface 214 opposite that of the bonding surface 212. As will be explained further below, the bonding surface 212 of the preform 208 bonds with the composite structure 204 via an electrically conductive adhesive mesh composition 216A. The preform 208 further includes a pair of supports 218 that extend substantially perpendicular from the attachment surface 214 of the base 210. The pair of supports 218 form a U-shape with the base 210 whereby a space that receives the rib 202 is formed between the pair of supports 218. Each support 218 includes a mounting surface 220 in the space. Thus, the mounting surfaces 220 of the pair of supports 218 face each other and bond to the rib 202 via the electrically conductive adhesive mesh composition 216A. Each support 218 further includes an attachment (second attachment) surface 222 opposite that of the mounting surfaces 220.

The electrically conductive adhesive mesh composition (hereinafter "mesh composition") 216A is disposed between the rib 202 and the mounting surfaces 220 of the supports 218 of the preform 208. Thus, the mesh composition 216A bonds the rib 202 to the supports 218 of the preform 208. The mesh composition 216A is also disposed between the composite structure 204 and the mounting surface 212 of the base 210 of the preform 208. Thus, the mesh composition 216A bonds the preform 208 to the composite structure 204. The mesh composition 216A is comprised of multiple conductive scrim layers where each conductive scrim layer includes a bonding adhesive 224A and a conductive mesh material 226A made from an electrically conductive material (e.g., metal). The bonding adhesive 224A and the conductive mesh material 226A are intertwined with each other such that the conductive scrim layers are electrically conductive. The mesh composition 216A further includes a mounting adhesive layer 228A that contacts the composite structure 204 to facilitate bonding of the multiple conductive scrim layers and the preform 208 to the composite structure 204.

Figure 2B:
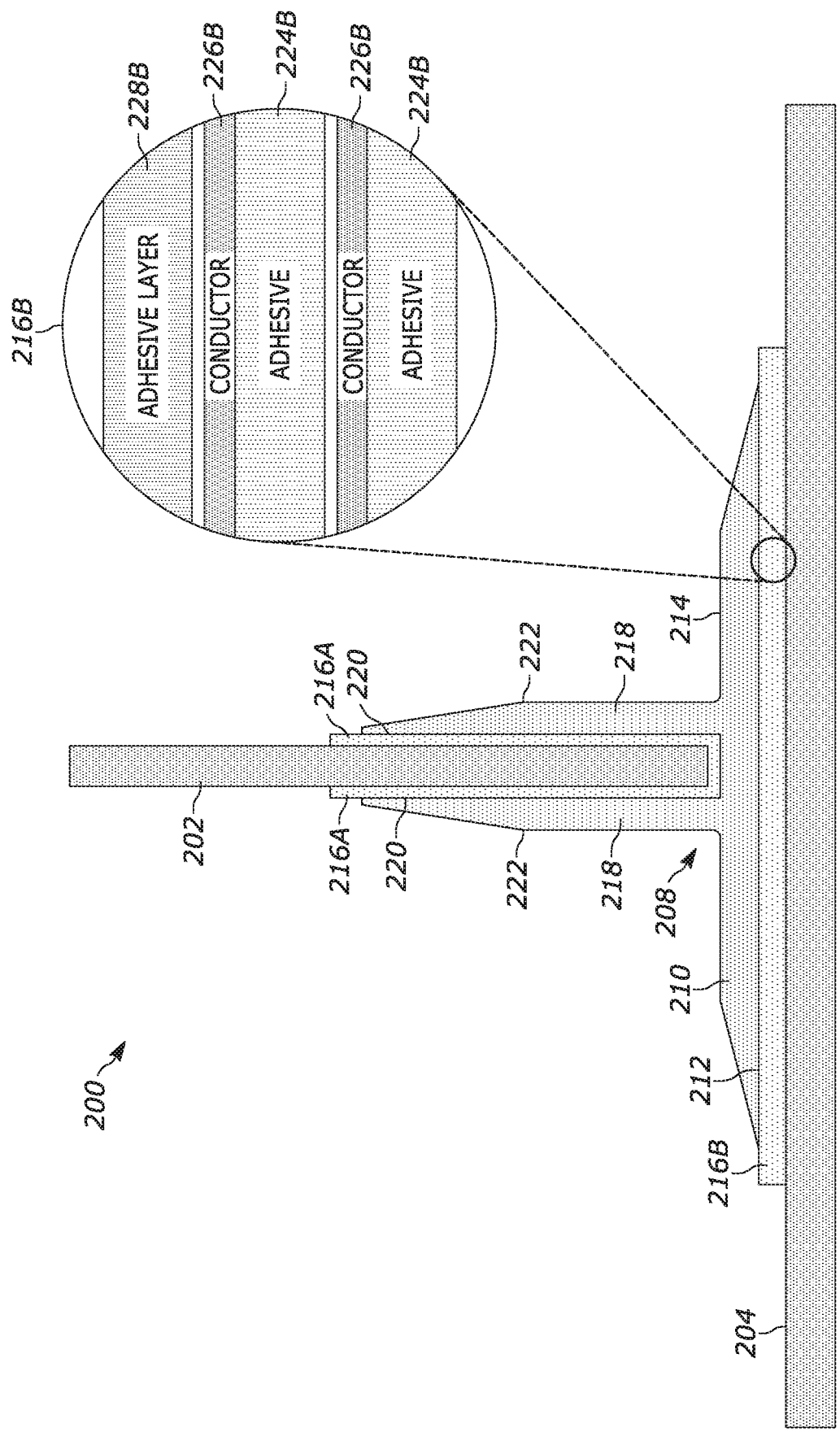

Alternatively, FIG. 2B illustrates another example of the orientation of a mesh composition 216B. As above, the mesh composition 216A is disposed between the rib 202 and the mounting surfaces 220 of the supports 218 of the preform 208. Thus, the mesh composition 216A bonds the rib 202 to the supports 218 of the preform 208. The mesh composition 216B disposed between the composite structure 204 and the mounting surface 212 of the base 210 of the preform 208 however, has a different configuration. The mesh composition 216B is comprised of multiple conductive scrim layers where each conductive scrim layer includes a bonding adhesive 224B and a conductive mesh material 226B made from an electrically conductive material (e.g., metal). The bonding adhesive 224B and the conductive mesh material 226B are intertwined with each other such that the conductive scrim layers are electrically conductive. The mesh composition 216B further includes a mounting adhesive layer 228B. In this example, the mounting adhesive layer 228B is in contact with mounting surface 212 of the base of the preform 208 to facilitate bonding of the multiple conductive scrim layers and the preform 208 to the composite structure 204. Thus, the mesh composition 216B in this example bonds the preform 208 to the composite structure 204.

Figure 3:
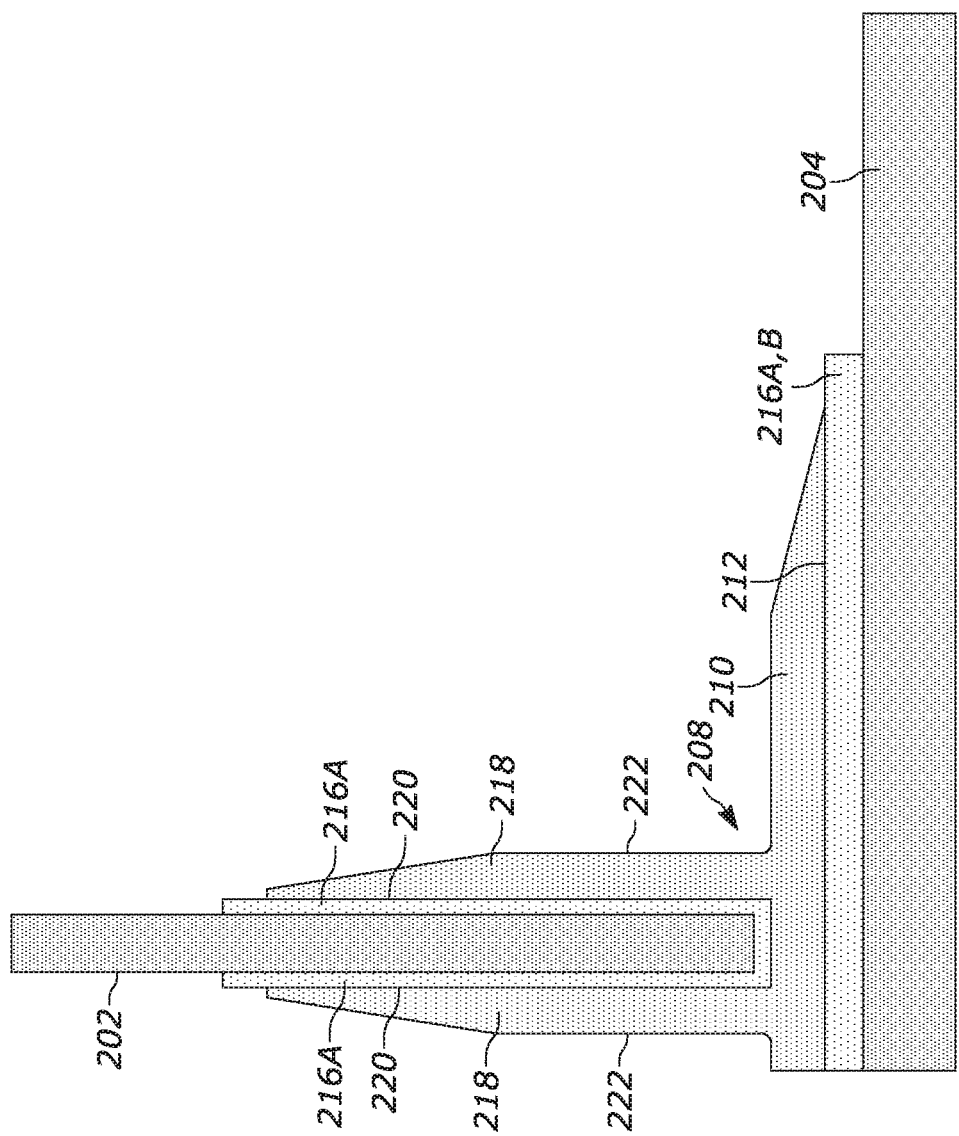
FIG. 3 is a close-up view of the composite bonded joint of FIGS. 2A and 2B.

Referring to FIG. 3, the mesh composition 216A, B, extends beyond each support 218 of the preform 208. Similarly, the mesh composition 216A, B extends beyond each side of the base 210 of the preform 208.

Figure 5C:
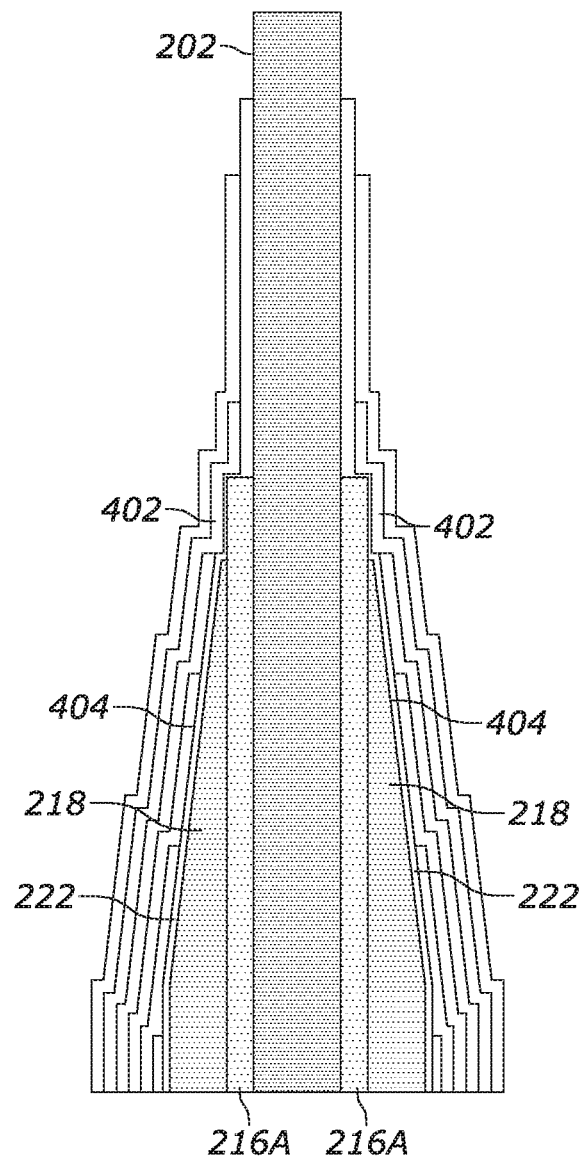

FIGS. 4-5C illustrate another example of a composite bonded joint 400 similar to the composite bonded joint 200 described above and illustrated in FIGS. 2 and 3. Thus, any features that are the same as the features described above will include the same reference numbers and will not be described again. Therefore, any reference is to be made to the example of FIGS. 2 and 3 in the following description of the example in FIGS. 4-5C.

In this example, the composite bonded joint 400 further includes structural overwraps 402 that are layered over the preform 208 and are made from a reinforcing material (e.g., carbon/epoxy woven prepreg) for structural reinforcement. The number of overwraps 402 may vary based on the application and may vary in length. In this example, there are six overwraps 402 of various length. The overwraps 402 are attached to the first and second attachment surfaces 214, 222 of the preform 208 with an attachment adhesive 404.

Referring to FIG. 5A, one or more overwraps 402 may extend beyond an end of the base 210 of the preform 208.

The extended overwraps 402 are attached to the attachment surface 214 of the base with the attachment adhesive 404. In addition, the attachment adhesive 404 may extend beyond the overwraps 402. Alternatively, the attachment adhesive 404 may stop at the end of the base 210 of the preform 208, as illustrated in the example in FIG. 5B.

Referring to FIG. 5C, one or more overwraps 402 may extend beyond an end of the supports 202 of the preform 208. The extended overwraps 402 are attached to the attachment surface 222 of the supports 202 with the attachment adhesive 404. In addition, the attachment adhesive 404 may extend beyond the overwraps 402.

Figure 6:
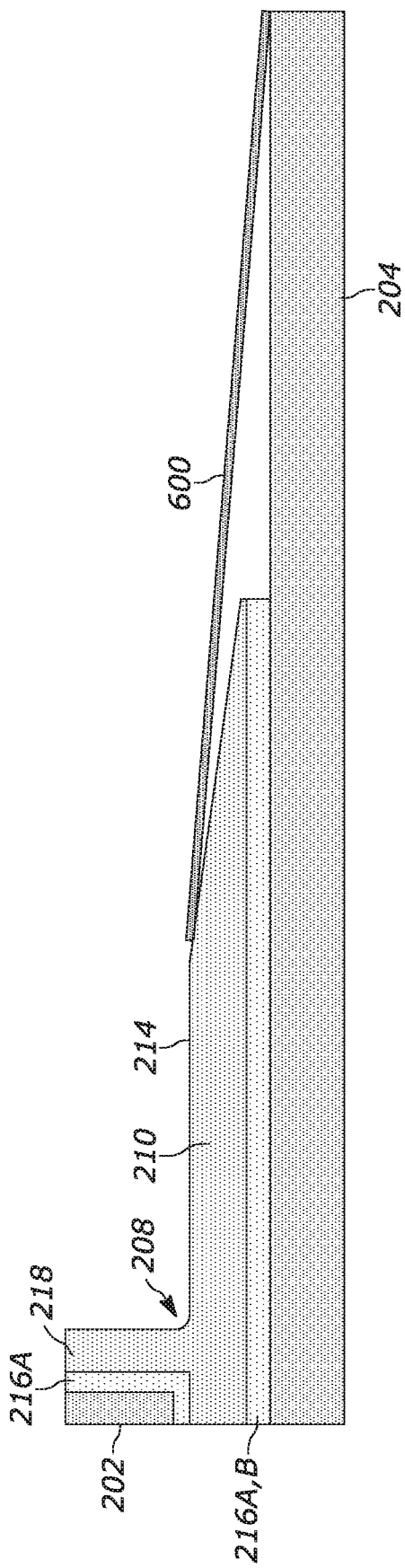
FIGS. 6 and 7 illustrate alternative examples where the composite bonded joint further includes a pair of fiberglass blades.
Figure 7:
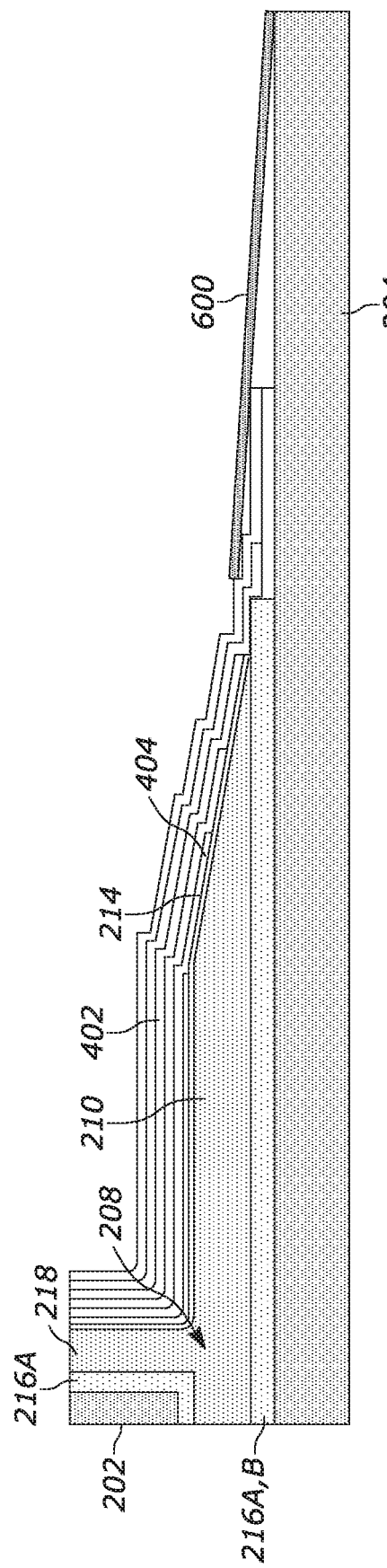

FIGS. 6 and 7 illustrate alternative examples where the composite bonded joint 200 further includes a pair of fiberglass blade 600. In the example in FIG. 6, the fiberglass blades 600 are attached to the attachment surface 214 on each side of the base 210 of the preform 208 and extend beyond the ends of the base 210 and attach to the composite structure 204. In the example in FIG. 7, the fiberglass blades 600 attach to the overwraps 402 and extend beyond the ends of the overwraps 402 and attach to the composite structure 204. The fiberglass blades 600 are comprised of two layer of fiberglass and are configured to encapsulate the mesh composition 216A, B that may ooze out from underneath the base 210 of the preform 208 during the bonding process. Thus, in the event of a lightning strike, the fiberglass blades 600 can contain the hot gas produced from the lightning current.

Figure 8:
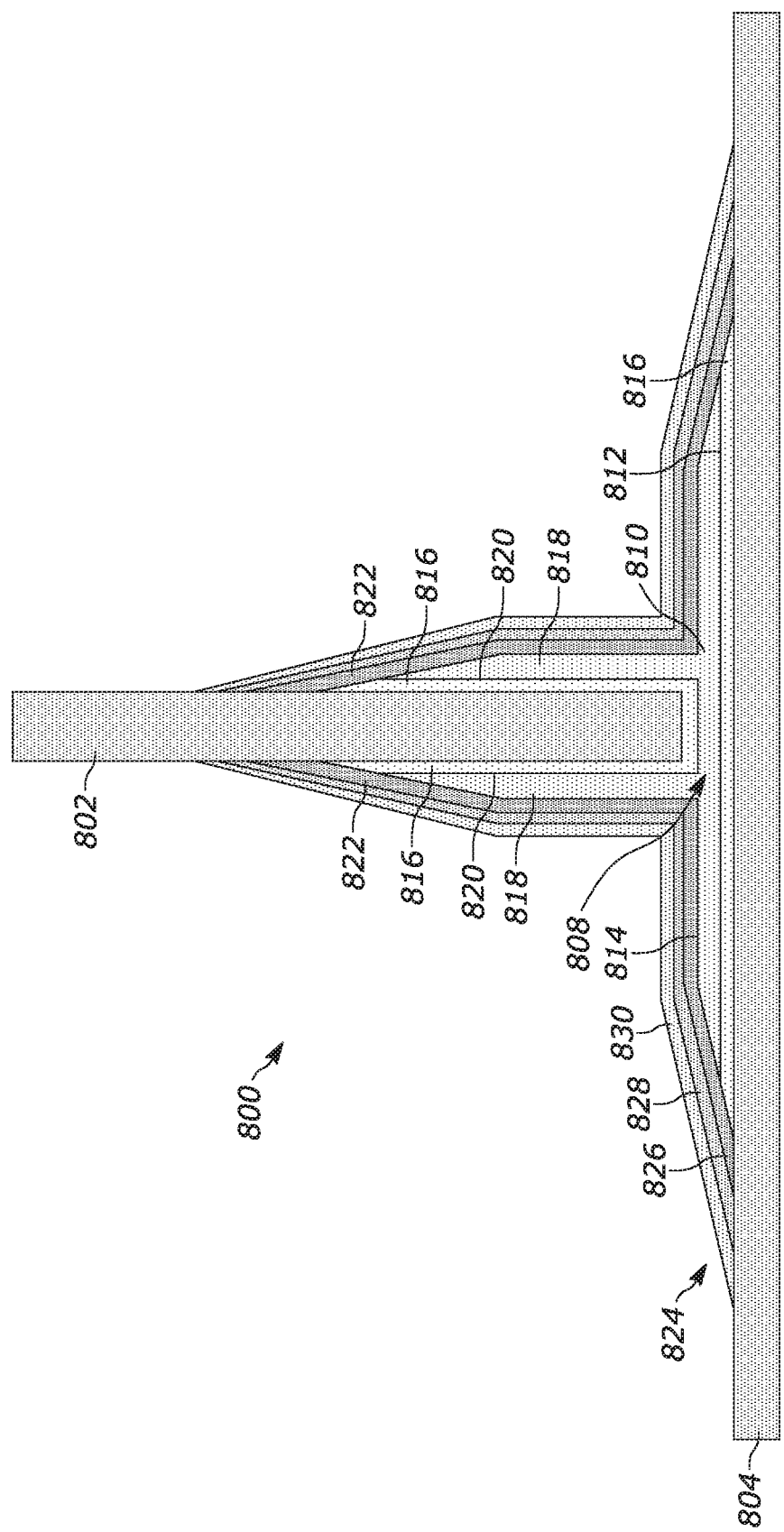
FIG. 8 is another example of a composite bonded joint that bonds a composite rib/spar to a composite structure, such as a skin of the wing of the aircraft.

FIG. 8 represents another example of a composite bonded joint 800 that bonds a rib/spar ("rib") 802 to a composite structure 804, such as a skin of the wing of the aircraft. Both the rib 802 and the composite structure 804 are made from composite materials that have an electrically conductive base material. Thus as will be explained in detail further below, the rib 802 and the composite structure 804 require prep work to remove non-conductive surface materials and expose the conductive base material.

The composite bonded joint 800 further includes an electrically conductive preform 808 made from a reinforced epoxy material (e.g., carbon/epoxy woven preform). The preform 808 includes a base 810 having a bonding surface 812 and an attachment (first attachment) surface 814 opposite that of the bonding surface 812. The bonding surface 812 of the preform 808 bonds with the composite structure 804 via a mounting adhesive 816. The preform 808 further includes a pair of supports 818 that extend substantially perpendicular from the attachment surface 814 of the base 810. The pair of supports 818 form a U-shape whereby a space that receives the rib 802 is formed between the pair of supports 818. Each support 818 includes a mounting surface 820 in the space. Thus, the mounting surfaces 820 of the pair of supports 818 face each other and bond to the rib 802 via the mounting adhesive 816. Each support 818 further includes an attachment (second attachment) surface 822 opposite that of the mounting surfaces 820.

Still referring to FIG. 8, the composite bonded joint 800 further includes an electrically conductive adhesive mesh composition (hereinafter "mesh composition") 824 disposed over the preform 808. The mesh composition 824 includes multiples layers comprised of a mounting adhesive layer 826, a conductive mesh 828 made from an electrically conductive material (e.g., metal), and one or more layers of an epoxy impregnated fiberglass material 830. The mesh composition 824 adheres to the rib 802, extends over the supports 818 and adheres to the attachment surface 822 of the supports 818, extends over the base 810 and adheres to the attachment surface 814 of the base 810, and finally extends to the surface of the composite structure 804. Thus, the mesh composition 824 provides an electrically conductive path around the composite bonded joint 800 between the rib 802 and the composite structure 804 in the event of a lightning strike. In addition, the mesh composition 824 provides another means to bond the preform 808 to the composite structure 804.

Figure 9:
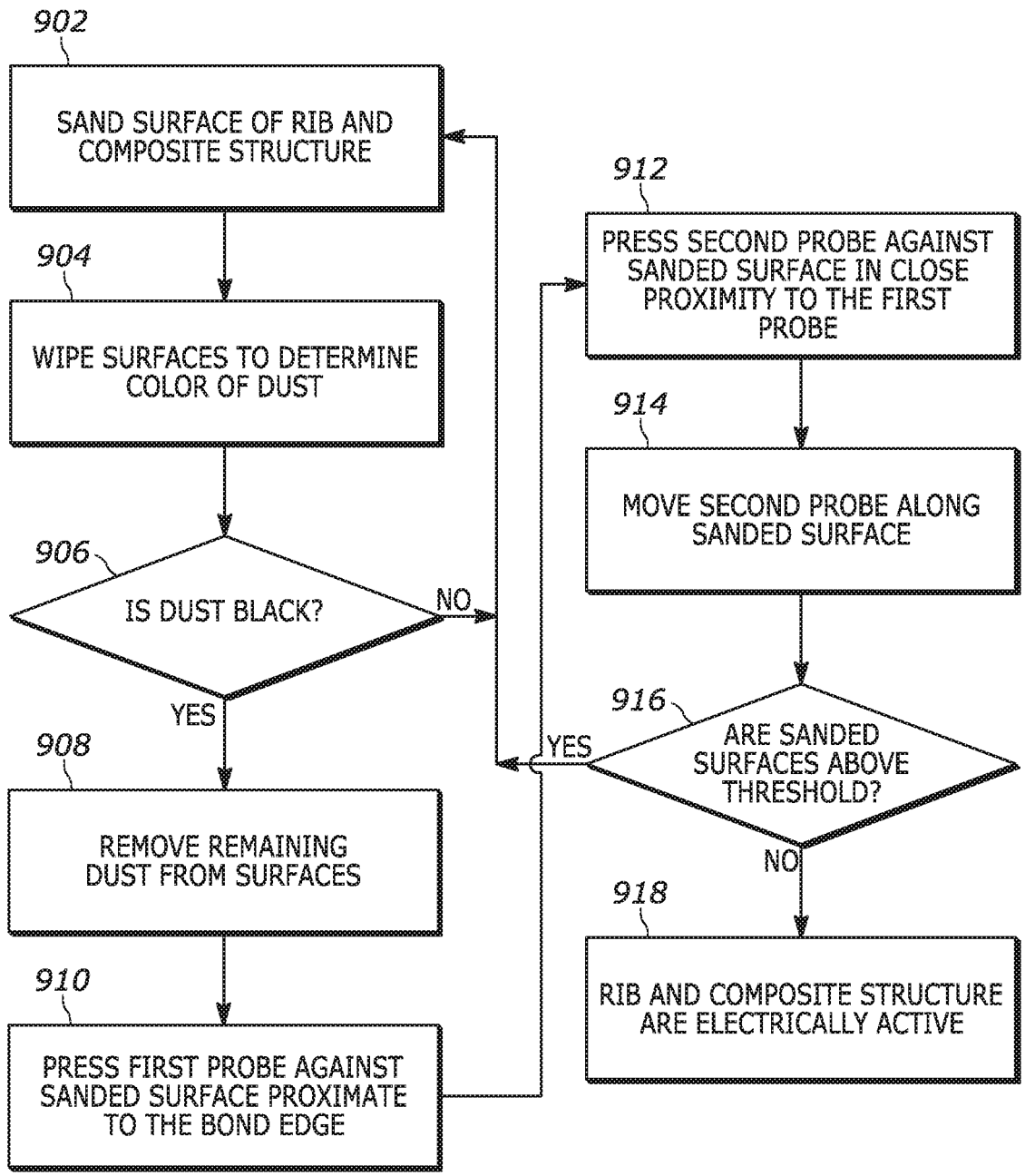
FIGS. 9-12B illustrate an example method of making the composite bonded joint that includes prep work and assembling the composite bonded joint.
Figure 10:
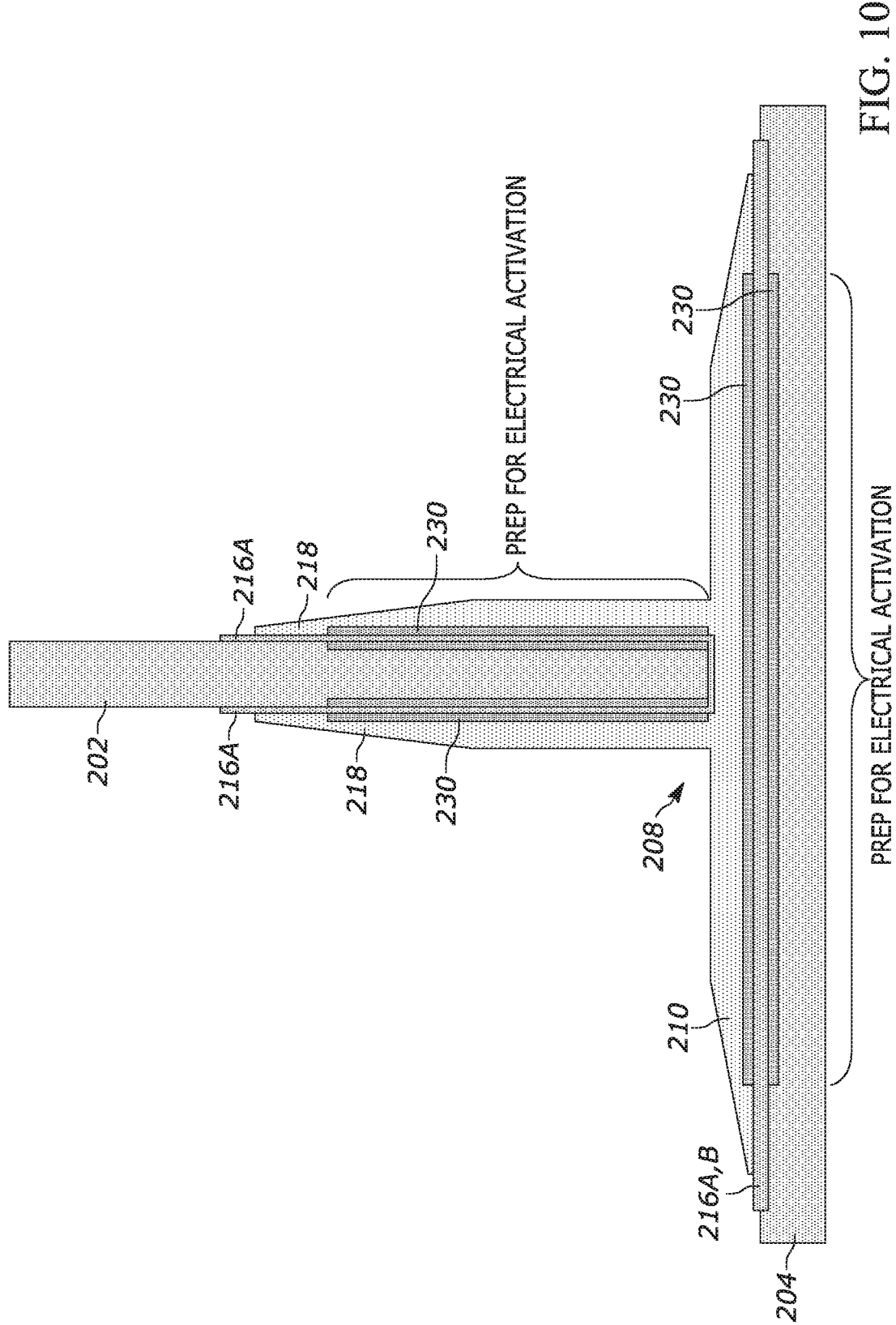
Figure 11:
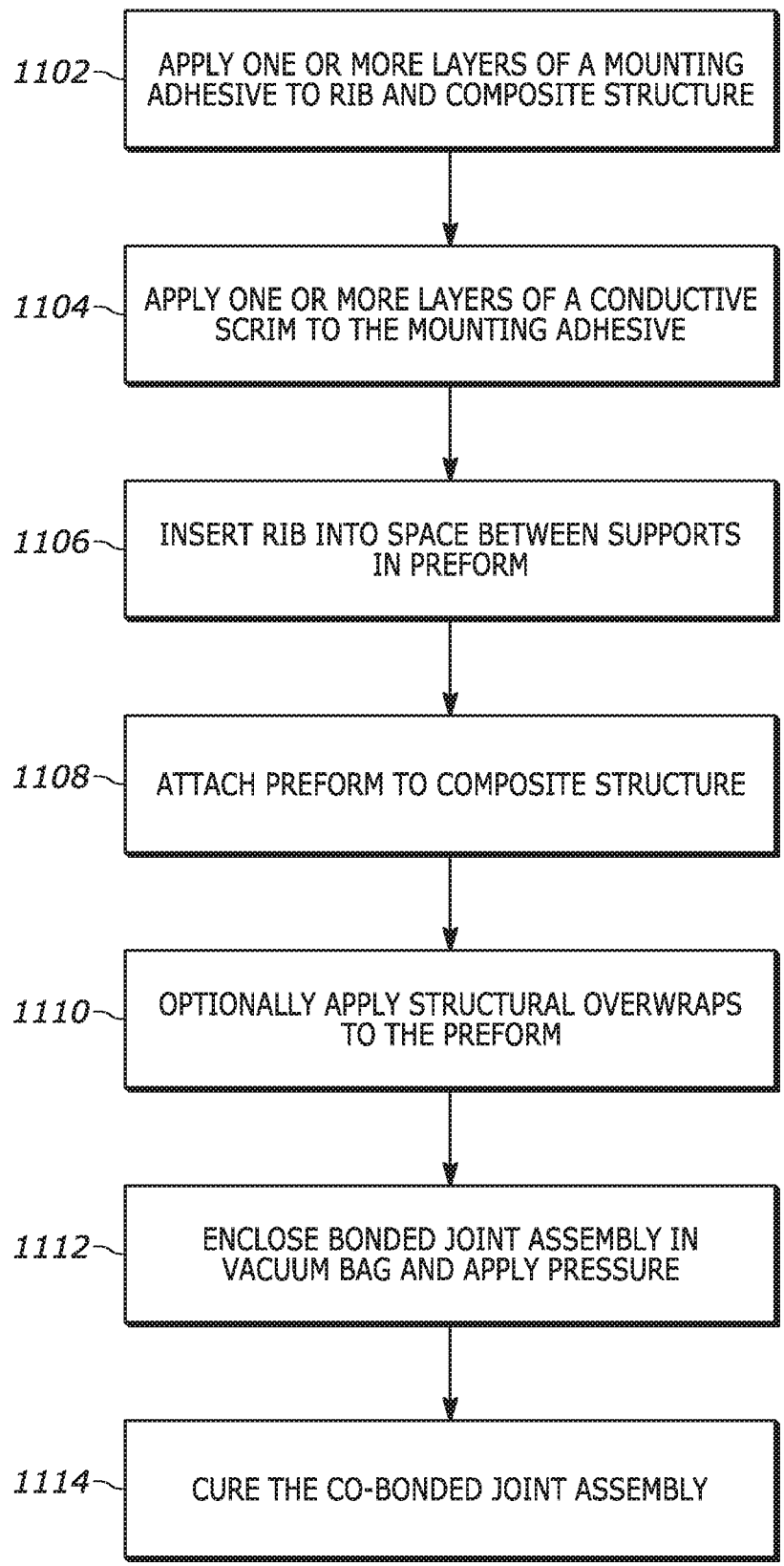
Figure 12A:
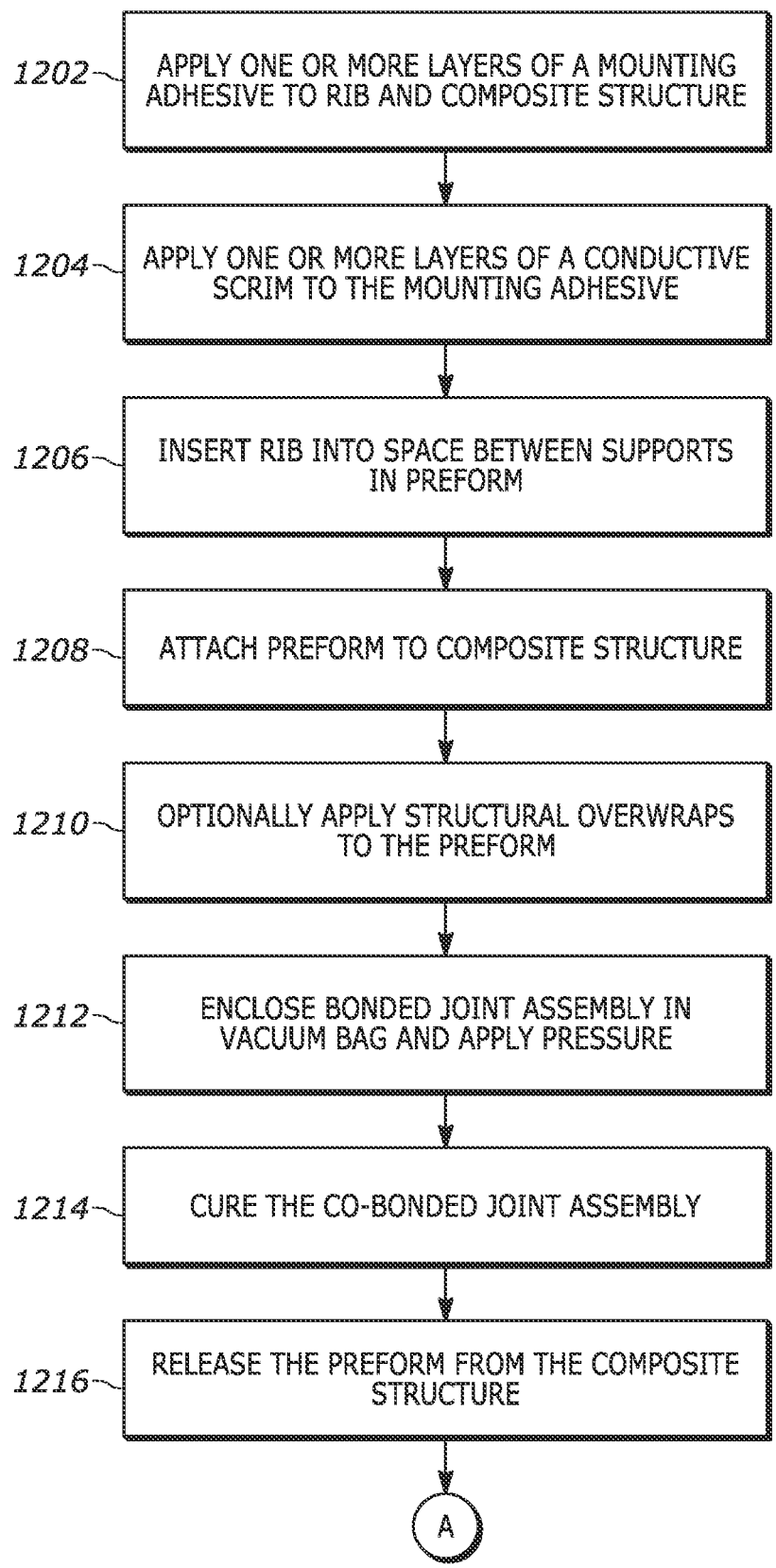
Figure 12B:
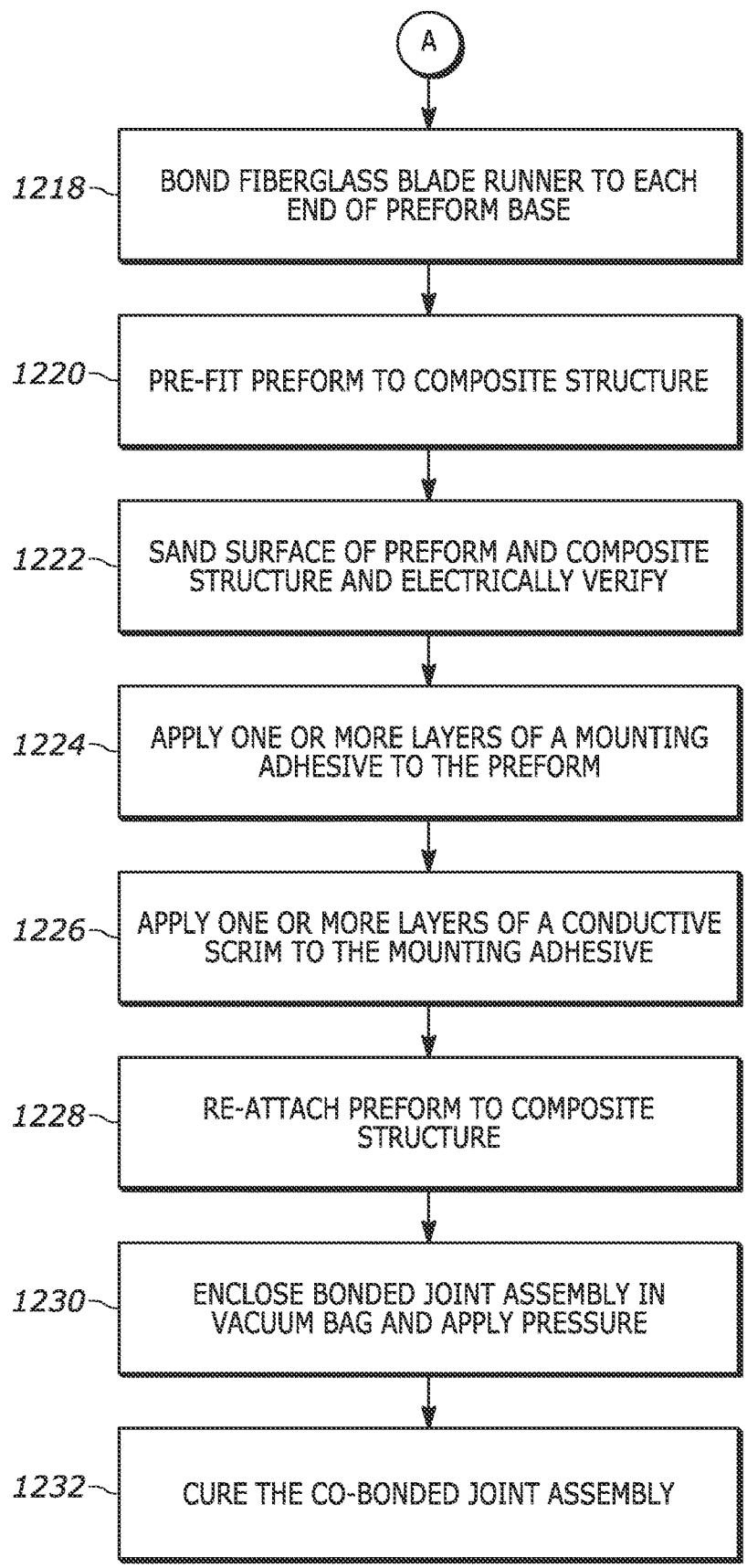

FIGS. 9-12B illustrate an example method of making the composite bonded joint that includes prep work and assembling the composite bonded joint. Specifically, FIGS. 9 and 10 illustrate a method of preparing a rib (e.g., composite rib 202) and a composite structure (e.g., composite structure 204) to electrically activate both the rib and composite structure prior to assembly. FIG. 11 illustrates a first method (Type I) of assembling a composite bonded joint (e.g., composite bonded joint 200). Finally, FIGS. 12A and 12B illustrate a second method (Type II) of assembling a composite bonded joint (e.g., composite bonded joint 200).

Referring to FIGS. 9 and 10 the method of preparing the rib (e.g., composite rib 202) and the composite structure (e.g., composite structure 204) to electrically activate both the rib and composite structure prior to assembly will now be explained. Electrically activating refers to the process of preparing the rib 202 and composite structure 204 and verifying that the rib and composite structure are electrically conductive. For simplicity, FIG. 10 illustrates the same reference numbers used for the example in FIG. 2A.

At 902, an area 230 of the surface of the rib 202 and composite structure 204 are sanded with a fine grit sandpaper until a resin surface gloss and high spots are removed and black dust is evident on a clean dry wiper. Sanding the surfaces with a fine grit sand paper removes non-conductive surface layer(s) and exposes electrically conductive fibers in the rib and the composite structure. The high spots are defined as resin rich areas caused by bagging, tooling mark off, etc. that needs to be sanded more than the adjacent areas. The sanding process is performed in a cross pattern (e.g., 0 and 90 degree sanding directions) to accomplish a uniform surface finish. During the sanding process, dust (sanding residue) may initially appear on the clean wiper as a greenish color. The sanding process however, continues until black dust is evident on the clean wiper. Thus at 904, the surfaces are wiped with a clean, dry wiper to determine a color of dust. At 906, a decision is made to determine if the dust color is black. If the decision is no, then the process loops back to 902 and the sanding process is continued. If the decision is yes, then at 908 the remaining dust is removed with a clean, dry wiper or with a vacuum.

Once the dust is removed the electrical verification process begins. Specifically, at 910, using a digital volt meter, a first probe is pressed against the sanded surface of the rib 202 or composite structure 204. The probe is located proximate to the end (edge) of the bond. At 912, a second probe is pressed against the sanded surface of the rib 202 or composite structure 204 in close proximity to the first probe and a resistance is measured. At 914, the second probe is moved back and forth along the length of the sanded surface to measure the resistance across the measured surface. At 916, a decision is made to determine if the measured resistance at any location along the measured length of the sanded surface is greater than a resistance threshold. If no, then at 918, the rib 202 and the composite structure 204 are deemed electrically activated and the process ends. If any of the measured locations measures above the resistance threshold, then the process loops back to 902 where those measured localized locations are re-sanded with a fine grit sandpaper and the process repeats for those localized locations.

Referring to FIG. 11, a first method of assembling the composite bonded joint (e.g., composite bonded joint 200) is illustrated. The assembly process takes place after the rib 202 and the composite structure 204 are electrically activated, as described above. At 1102, one or more layers of a mounting adhesive (e.g., mounting adhesive layer 228A) is applied to the electrically activated surfaces of the rib 202 and the composite structure 204 (see FIG. 2A). At 1104, one or more layers of a conductive scrim layer comprised of an adhesive (e.g., bonding adhesive 224A) intertwined with a conductor (e.g., conductive mesh material 226A) are applied on the mounting adhesive layer 228A (see FIG. 2A). At 1106, the rib 202 is inserted into the space defined between supports (e.g., supports 218) of a preform (e.g., preform 208) such that the surfaces (e.g., mounting surfaces 220) contact the rib 202. At 1108, the preform 208 is attached to a surface of the composite structure 204 such that a surface (e.g., bonding surface 212) of the preform 208 contacts the composite structure 204. As an option, at 1110, overwraps (e.g., structural overwraps 402) may be layered over the preform 208 for structural reinforcement. The overwraps 402 attach to surfaces (e.g., first and second attachment surfaces 214, 222) of the preform 208 with an adhesive (e.g., attachment adhesive 404). At 1112, the composite bonded joint 200 is enclosed in a vacuum bag and put under a vacuum to thereby apply a bonding pressure to the composite bonded joint 200. At 1114, the composite bonded joint 200 is cured to a curing temperature.

Referring to FIGS. 12A and 12B, a second method of assembling the composite bonded joint (e.g., composite bonded joint 200) is illustrated. The assembly process takes place after the rib 202 and the composite structure 204 are electrically activated, as described above. The second method or Type II assembly method is a two-stage process that begins at 1202. At 1202, one or more layers of a mounting adhesive (e.g., mounting adhesive layer 228A) is applied to the electrically activated surfaces of the rib 202 and the composite structure 204. At 1204, one or more layers of a conductive scrim layer comprised of an intertwined adhesive (e.g., bonding adhesive 224A) and a conductor (e.g., conductive mesh material 226A) are applied on the mounting adhesive. At 1206, the rib 202 is inserted into the space defined between supports (e.g., supports 218) of a preform (e.g., preform 208) such that the surfaces (e.g., mounting surfaces 220) contact the rib 202. At 1208, the preform is attached to the composite structure 204 such that a surface (e.g., bonding surface 212) of the preform 208 contacts the composite structure 204. As an option, at 1210, overwraps (e.g., structural overwraps 402) may be layered over the preform 208 for structural reinforcement. The overwraps 402 attach to surfaces (e.g., first and second attachment surfaces 214, 222) of the preform 208 with an adhesive (e.g., attachment adhesive 404). At 1212, the composite bonded joint 200 is enclosed in a vacuum bag and put under a vacuum to thereby apply a bonding pressure to the composite bonded joint 200. At 1214, the composite bonded joint is cured. At 1216, the preform 208 is released from the composite structure 204. At 1218, a fiberglass blade (e.g., fiberglass blade 600) is bonded to the first attachment surface 214 on each end of the base 210 of the preform 208, as illustrated in FIG. 6 or to a surface or the structural overwraps 402, as illustrated in FIG. 7. As mentioned above, the fiberglass blade 600 contains the mesh composition 216A, B that may ooze from under the preform 208 during the second stage cure. At 1220, prior to re-bonding the preform 208 to the composite structure 204, the preform 208 is pre-fit to the composite structure 204 using an impression film. The impression film includes two sheets of nylon with a layer of an adhesive disposed between the two nylon sheets. At 1222, the mounting surface 212 of the preform 208 and the surface of the composite structure 204 are sanded and electrically verified as described above and illustrated in FIG. 9 to remove any adhesive residue that may remain when the preform is released from the composite structure 204 and to expose electrically conductive fibers. At 1224, one or more layers of a mounting adhesive (e.g., mounting adhesive layer 228B) is applied to the mounting surface 212 of the base 210 of the preform 208 (see FIG. 2B). At 1226, one or more layers of a conductive scrim layer comprised of an adhesive (e.g., bonding adhesive 224B) intertwined with a conductor (e.g., conductive mesh material 226B) are applied on the mounting adhesive layer 228B (see FIG. 2B). At 1228, the preform 208 is re-attached to the composite structure 204 such that the bonding surface 212 of the preform 208 contacts the composite structure 204. At 1230, the composite bonded joint 200 is enclosed in a vacuum bag and put under a vacuum to thereby apply a bonding pressure to the composite bonded joint 200. At 1232, the composite bonded joint is cured to a temperature required to cure the adhesive and preform.

As described above, the innovative composite bonded joint disclosed herein provides lightning strike protection on aviation vehicles without the use of mechanical fasteners. The composite bonded joint uses an electrically conductive adhesive mesh that carries current from a lightning strike over the adhesively bonded joints. The process has been demonstrated to prevent fuel vapor ignition inside of adhesively bonded composite fuel tanks and maintain structural integrity when subject to severe (Zone 1A) lightning strikes.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A bonded joint for use in bonding composite materials comprising:
   a composite rib having exposed electrically conductive fibers in a surface the composite rib;
   a composite structure having exposed electrically conductive fibers in a surface of the composite structure;
   an electrically conductive preform including a base and a pair of supports that extend from the base and form a U-shape with the base, the electrically conductive preform facilitating a bond between the composite rib and the composite structure; and
   an electrically conductive mesh composition that bonds the composite rib to the preform and that bonds the preform to the composite structure, the electrically conductive mesh composition being disposed over the base of the preform and extending to the surface of the composite structure and being disposed over the pair of supports and extending to the surface of the rib to provide an electrically conductive path around the bonded joint;
   further comprising structural overwraps layered over and adhesively attached to the preform, the structural overwraps extending beyond each end of the base onto the composite structure and beyond an end of each of the pair of supports onto the composite rib.

2. The bonded joint of claim 1, wherein the mesh composition is disposed between the composite rib and the pair of supports of the preform and between the base of the preform and the composite structure.

3. The bonded joint of claim 2, wherein the electrically conductive mesh composition includes at least one conductive scrim layer and at least one mounting adhesive layer.

4. The bonded joint of claim 3, wherein the at least one scrim layer includes a bonding adhesive and a conductive mesh material, wherein the bonding adhesive and the conductive mesh material are intertwined.

5. The bonded joint of claim 1, further comprising a fiberglass blade attached to an attachment surface of the base on each side of the base, the fiberglass blade extending onto and adhesively attached to the composite structure to facilitate containment of the electrically conductive mesh composition during assembly.

6. The bonded joint of claim 1, wherein the electrically conductive mesh composition includes at least one conductive scrim layer and at least one mounting adhesive layer.

7. The bonded joint of claim 6, wherein the at least one scrim layer includes a bonding adhesive and a conductive mesh material, wherein the bonding adhesive and the conductive mesh material are intertwined.

8. The bonded joint of claim 7, further comprising structural overwraps layered over and adhesively attached to the electrically conductive mesh composition, the structural overwraps extending beyond the mesh composition onto the composite structure on each side of the base and onto the composite rib adjacent to the pair of supports.

9. The bonded joint of claim 8, further comprising a mounting adhesive layer disposed between the composite rib and the pair of supports of the preform and between a bonding surface of the base of the preform and the composite structure.

10. A method of assembling a composite bonded joint comprising:
    applying at least one layer of an adhesive onto mounting surfaces of a pair of supports of an electrically conductive preform;
    applying the at least one layer of the adhesive onto a surface of an electrically conductive composite structure having exposed electrically conductive fibers or to a mounting surface of a base having exposed electrically conductive fibers of the electrically conductive preform;
    applying at least one layer of an electrically conductive scrim that includes a bonding adhesive intertwined with an electrically conductive mesh material on the mounting surfaces of the pair of supports and on the surface of the electrically conductive composite structure or the mounting surface of the base;
    inserting an electrically conductive composite rib having exposed electrically conductive fibers into a U-shaped space defined by the pair of supports and the base of the electrically conductive preform such that the mounting surfaces contact surfaces of the electrically conductive composite rib;
    attaching the base of the electrically conductive preform to the electrically conductive composite structure, the electrically conductive mesh composition being disposed over the base of the preform and extending to the surface of the composite structure and being disposed over the pair of supports and extending to the surface of the rib to provide an electrically conductive path around the bonded joint; and
    curing the composite bonded joint;
    wherein prior to curing the composite bonded joint, the method further comprising attaching structural overwraps to attachment surfaces of the electrically conductive preform and to the surfaces of the electrically conductive composite rib and the electrically conductive composite structure.

11. The method of claim 10, wherein prior to curing the composite bonded joint, the method further comprising enclosing the composite bonded joint in a vacuum bag and applying a vacuum to apply a bonding pressure to the composite bonded joint.

12. The method of claim 10 further comprising releasing the electrically conductive preform from the electrically conductive composite structure and attaching a fiberglass blade to an attachment surface on each end of the base of the electrically conductive preform to contain the at least one layer of the adhesive and the at least one layer of the electrically conductive scrim during curing.

13. The method of claim 12 further comprising sanding the mounting surface of the base of the electrically conductive preform and the surface of the electrically conductive composite structure to remove adhesive residue and to expose electrically conductive fibers.

14. The method of claim 13 further comprising applying at least one layer of a mounting adhesive to the mounting surface of the base of the electrically conductive preform and applying one or more layers of the electrically conductive scrim to the mounting adhesive.

15. The method of claim 14 further comprising: re-attaching the base of the electrically conductive preform to the electrically conductive composite structure; enclosing the electrically conductive composite bonded joint in the vacuum bag and applying a vacuum to apply a bonding pressure to the composite bonded joint; and curing the composite bonding joint.

16. The bonded joint of claim 1, wherein the bonded joint is cured.

* * * * *